United States Patent Office 3,379,741
Patented Apr. 23, 1968

3,379,741
PROCESS FOR OBTAINING NAPHTHOQUINONE
Otto Tschamper, Liestal, Basel, and Willy Regenass, Neu-Allschwil, Switzerland, assignors to Ciba Limited and Schweizerische Teerindustrie AG., Basel and Pratteln, Switzerland, both companies of Switzerland
Filed Nov. 25, 1964, Ser. No. 413,845
Claims priority, application Switzerland, Dec. 9, 1963, 15,050/63
8 Claims. (Cl. 260—396)

ABSTRACT OF THE DISCLOSURE

A process is provided for separating the components of a hot gas current containing naphthoquinone, phthalic anhydride and naphthalene wherein the hot gas current is contacted with atomized water in a manner such that the temperature of the gas current is reduced to 30–70° C. Substantially all of the naphthalene in the gas current will remain in the gas current, while substantially all of the naphthoquinone and phthalic anhydride are retained by the water. The naphthoquinone is thereafter isolated from the aqueous medium.

---

Figure 1:
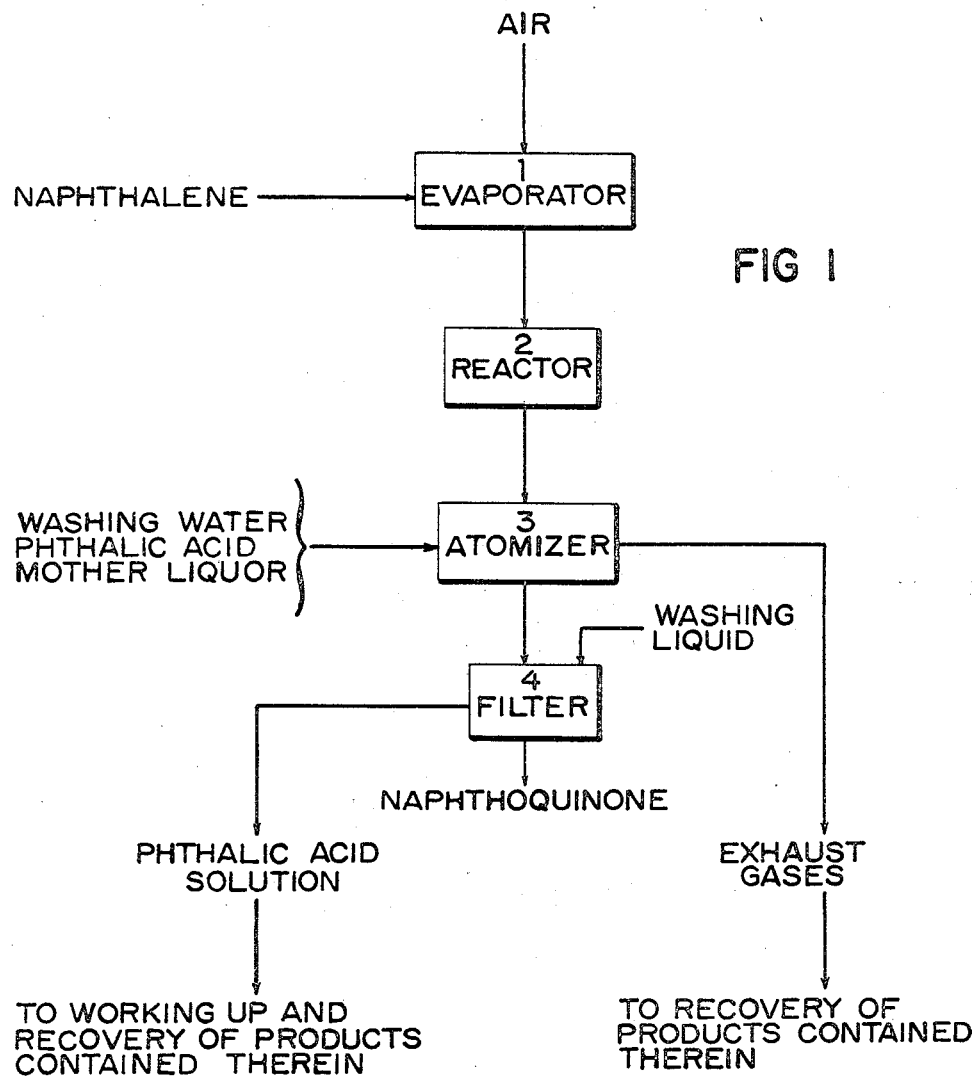

It is known that naphthoquinone is obtained when naphthalene is allowed to undergo atmospheric oxidation in the presence of a catalyst. However, no way is known to present-day art of conducting the oxidation in a manner such that only naphthoquinone is formed; in fact, there is always concurrently formed phthalic anhydride which may even preponderate when certain catalysts are used. In addition, a major share of naphthalene escapes the oxidation. It is therefore necessary to isolate the three compounds, i.e., naphthalene, naphthoquinone and phthalic anhydride, from the oxidation gas current and to separate them from one another. In the past the conventional method to achieve this consisted in isolating the three products together from the gas current and then separating them from one another by distribution between solvents followed by extraction. In this method the naphthoquinone and the naphthalene were always separated together from the phthalic anhydride and the naphthalene was then separated from the naphthoquinone.

It has now been found that naphthoquinone can be produced in an advantageous manner and without needing organic solvents when only naphthoquinone and phthalic anhydride are separated with water under suitable conditions from the gas current, at least the bulk of naphthalene remaining in the gas current and then being separately removed from it.

Thus, the present invention provides a process for separating naphthoquinone from a hot gas current containing naphthoquinone, phthalic anhydride and naphthalene, such as is obtained by the catalytic gas phase oxidation of naphthalene to form naphthoquinone, wherein water is atomized in an atomizer in a manner such that the gas current assumes a temperature of 30° to 70° C., preferably 50° to 60° C., whereby the aqueous medium having a temperature from 30° to 70° C., preferably from 50° to 60° C., retains naphthoquinone and phthalic anhydride, while at least the bulk of naphthalene remains in the gas current, whereupon naphthoquinone is isolated from the aqueous medium. It is advantageous to use an amount of water sufficient to ensure that a highly concentrated phthalic acid solution is obtained. The separation of naphthoquinone and phthalic anhydride can be regulated so that substantially all naphthalene remains in the gas current.

If the gas current has an extremely high content of naphthalene, a minor share of it may be separated by the aqueous medium and then removed from it together with the separated naphthoquinone. In this case the resulting naphthoquinone is contaminated with naphthalene; if desired, it can be processed in a suitable manner to yield pure naphthoquinone containing only 1 to 2% of naphthalene.

For reasons of economy it is necessary to isolate not only naphthoquinone but also phthalic acid from the phthalic acid solution as well as the naphthoquinone dissolved in it and to recover any unconsumed naphthalene remaining in the treated gas current leaving the atomizer and any residual naphthoquinone. Accordingly, the invention is further concerned with the processing and recovery of these three products.

The new process offers the following significant advantages:

(1) Economical, direct separation of naphthoquinone from the other reactor products contained in the gas current.

(2) Production of commercially pure naphthoquinone under mild conditions so that the thermally labile product is not decomposed.

(3) Separation and hydrolysis of phthalic anhydride directly within the atomizer and production of a highly concentrated phthalic acid solution which is easy to process.

(4) Production or recovery of any naphthoquinone remaining in the waste gas current leaving the atomizer.

(5) Production or recovery of the naphthoquinone contained in the phthalic acid solution, combined with the removal of any impurities present.

(6) Production of a phthalic acid which can be processed by known methods to yield extremely pure phthalic anhydride.

(7) The process is largely a closed-cycle operation which yields substantially no waste water and its gaseous waste product leaves the installation in the purified state.

The process steps illustrated in FIGURE 1 of the accompanying drawing, showing the manufacture of naphthoquinone, are described below in their proper sequence:

(a) Producing the converter gases.—Naphthalene is vaporized in an air current and conveyed over a specific naphthoquinone catalyst. The naphthalene concentration in the mixture ranges from 0.1 to 5 mol percent, preferably from 0.5 to 2 mol percent. The temperature inside the converter is from 350° to 450° C. Depending on the available catalyst, the oxidation can be carried out in a solid bed or in a fluidized bed. The required time of contact depends largely on the properties of the individual catalyst; with the catatlysts known at this stage it ranges from ½ to 20 seconds.

On all naphthoquinone catalysts so far described naphthalene forms a deposit consisting of the desired naphthoquinone and phthalic anhydride. In addition, the naphthoquinone formed on the catalyst is slowly further oxidized to phthalic anhydride. It is therefore necessary to work at an incomplete conversion rate if the aim is an economic yield of naphthoquinone. Therefore, in addition to the desired naphthoquinone the converter gases invariably contain also some phthalic anhydride and naphthalene. In typical cases 25 to 50% of the invested naphthalene have been converted at the discharge end of the converter into naphthoquinone and 20 to 40% into phthalic anhydride, while 15 to 55% remain unchanged. A solid bed catalyst which is particularly suitable for the manufacture of naphthoquinone has been described in patent application Ser. No. 347,425, filed Feb. 26, 1964 by Anton Kaiser et al.

(b) Isolation of naphthoquinone and phthalic anhydride and manufacture of naphthoquinone.—The condensation of naphthoquinone and phthalic anhydride is performed by injecting water or phthalic acid solution into the current of hot converter gas. The apparatus used for this process step, hereinafter referred to as the "atomizer," may be a converging nozzle with central feed duct for the liquid or a device of the ejector type (scrubber).

This type of cooling offers the following advantages over other cooling methods:

(1) Cooling proceeds very rapidly, which is of great importance to the sensitive naphthoquinone; (2) the density of the condensation centers (water droplets) in the cooling zone is so great that no mists are formed (converter gases are known for their tendency to form mists on cooling which are very difficult to remove); (3) owing to the presence of water phthalic anhydride undergoes spontaneous hydrolysis (whereas a separate process step is required for the hydrolysis which is essential to the separation of phthalic anhydride when cooling is performed with an organic solvent; cf. U.S. Patent No. 2,938,913 to Robert G. Weyker et al., patented May 31, 1960); and (4) the naphthalene can be kept almost quantitatively in the gas phase during the condensation of naphthoquinone and phthalic anhydride.

Figure 2:
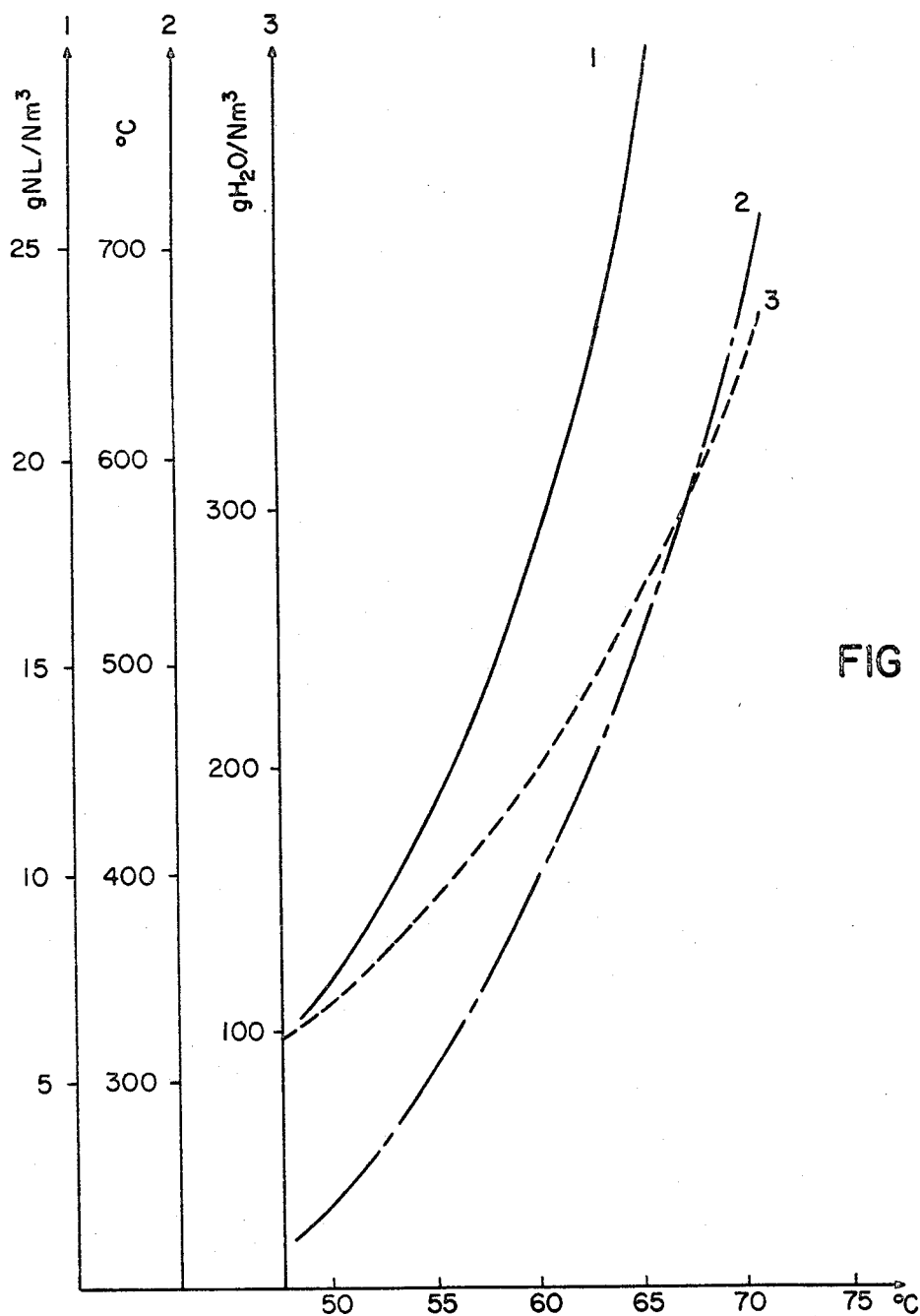

In the conventional cooling methods naphthalene is always separated along with naphthoquinone. Even in the process of this invention the separating conditions must be very carefully adjusted if it is desired to obtain naphthoquinone that is free from naphthalene; the water must be evenly distributed throughout the gas current and any under-cooling of the injected water must be prevented. In general the process is conducted so that the temperature of the feed water differs at most only by a few degrees centigrade from the temperature of the gases issuing from the atomizer; accordingly, cooling is achieved mainly by evaporation of water. FIGURE 2 of the accompanying drawing reveals the relationships between the operating variables of the atomizer. On the abscissa there is plotted the exit temperature, whereas on the ordinate 1 indicates the naphthalene saturation concentration (that is to say the naphthalene concentration above which naphthalene participates in the condensation at the indicated exit temperature) in grams per standard cubic meter of air entering the atomizer in the dry state. (Wherever used below, 1 standard cu. m. indicates the amount of gas contained in 1 cubic meter at 0° C. under 760 mm. Hg pressure.) 2 indicates the temperature of the converter gases needed to reach the individual exit temperature (assuming that the water flowing in has the exit temperature). 3 is the amount of water evaporating for every standard cu. m. of dry air (g. $H_2O$/s.c.m.).

Thus, in the process step described the current of converter gases is divided into a waste gas current, containing substantially all naphthalene and some naphthoquinone (3 to 13% of the total amount) and an aqueous suspension containing substantially all phthalic anhydride (as dissolved phthalic acid) and the bulk of naphthoquinone. The further treatment of the waste air is described in section (d) below.

The aqueous suspension is separated by filtration into solid naphthoquinone and an aqueous solution that contains substantially all phthalic acid and a small share of naphthoquinone (5 to 10% of the total amount). The processing of the phthalic acid solution is described in section (c) below. In general, the naphthoquinone is sufficiently pure for its further processing after having been washed with hot water (or other suitable liquids resulting from subsequent process stages). When the naphthalene content of the naphthoquinone exceeds the permissible limit, it is further treated as described in section (e) below. The washing liquor may be combined with the phthalic acid solution, though it is preferable to return it to the atomizer.

(c) Processing the phthalic acid solution.—The aqueous phthalic acid solution obtained in the atomizer contains naphthoquinone corresponding to its saturation concentration at the separating temperature as well as contaminants (coloring by-products of the oxidation reaction).

When the rate of water supply is suitably adjusted, the phthalic acid solution contains substantially more phthalic acid than corresponds to the saturation concentration of the phthalic acid at the separating temperature. This unexpected fact is significant to the new process in two ways: Firstly, because the solution must be cooled and reheated for the isolation of phthalic acid and, per kg. of phthalic acid, less heat must be transferred as the concentration of the solution rises. Secondly, because the solution contains also naphthoquinone corresponding to its solubility and, per kg. of phthalic acid, less naphthoquinone is carried away by this solution as the concentration of phthalic acid rises. To recover phthalic acid (as well as for recovering the naphthoquinone) the naphthoquinone and the contaminants must be removed from the aqueous solution. At this stage of the known art this is done by solvent extraction, though one of the two process steps described below is more advantageous:

(1) Naphthoquinone can be caused to crystallize by cooling a strongly oversaturated phthalic acid solution, without phthalic acid crystallizing out at the same time.

A solution which has been saturated with phthalic acid at, for example 60° C., and contains 1.2 g. of naphthoquinone per liter and is contaminated with a small amount of impurities, is freed from these impurities by conveying the warm solution through a column of active carbon saturated with naphthoquinone and then allowed to crystallize. When the solution purified in this manner is allowed to cool to 30° C., 0.6 g. of naphthoquinone per liter crystallizes from it in a purity of 90% so that this crystallizate can be combined with the main fraction of naphthoquinone. If the solution is badly contaminated, there is a risk of the column of active carbon being exhausted too quickly; in such a case the bulk of the contaminants is crystallized together with the naphthoquinone on cooling of the solution. Such a crystallizate is as a rule unsuitable for combination with the bulk of naphthoquinone but is instead fed into the vaporizer possibly after having been dissolved in the naphthalene to be fed into the reactor. In this process about 85% of the naphthoquinone thus introduced is not decomposed on being conveyed over the catalyst, whereas the volatile contaminants are specifically burnt up on the catalyst and the nonvolatile contaminants remain inside the vaporizer. If this crystallization is carried out at a low temperature, part of the naphthoquinone depending on its solubility always remains dissolved. These remnants, too, can be removed, preferably by adsorption on active carbon. To prevent phthalic acid precipitating when it is percolated through the carbon, the solution must be heated above the saturation temperature of phthalic acid.

When the solution, which is now substantially free from naphthoquinone, is allowed to cool, phthalic acid crystallizes out in pure, very advantageous form. Partial regeneration of the carbon can be achieved by the heated mother liquor from the phthalic acid crystallization which is then returned to the atomizer. The final regeneration can be carried out with a suitable solvent or preferably with an aqueous alkali solution.

(2) The phthalic acid solution containing naphthoquinone is extracted with the naphthalene intended for feeding the reactor. The mixture of naphthalene and naphthoquinone thus obtained is returned to the reactor. About 85% of the naphthoquinone extracted in this manner passes through the reactor without decomposing, whereas tarry by-products extracted at the same time, provided they are volatile and are not retained in the naphthalene vaporizer of the reactor, are specifically burnt up on the catalyst.

A difficulty involved in this extraction is that the naphthoquinone-containing naphthalene and the aqueous phthalic acid solution are of an almost identical specific gravity. This difficulty can be by-passed by adding to the naphthalene a volatile solvent that is specifically much lighter or heavier than the phthalic acid solution, this solvent then being expelled again before injecting the naphthalene+naphthoquinone mixture into the reactor.

If the extracted warm phthalic acid solution still contains contaminants that disturb the subsequent crystallization of phthalic acid or make the processing of phthalic acid to furnish a highly pure phthalic anhydride impossible, it is purified by being finally conveyed through a column of active carbon. The phthalic acid is then crystallized by cooling the solution.

(d) Separating and recovering the products contained in the current of waste gases issuing from the atomizer.— The current of waste gas from the atomizer (see FIGURE 1) contains substantially all naphthalene present in the reactor gas current, steam in the saturation concentration and, depending on the completeness of the equilibrium adjustment in the atomizer, up to three times more naphthoquinone than would be expected from the vapour tension. Furthermore, it contains small amounts of by-products that have a strong irritant effect on the skin and mucosa. These products can be removed and recovered from the waste gas current in a variety of ways, such as by washing with oil, cooling and/or adsorption on active carbon.

(1) If the condensation in the atomizer is performed under conditions that give rise to a naphthalene-containing naphthoquinone (which must be purified as described in section (e) below), the final separation is preferably conducted under conditions that supply the warm air required for this operation. In this case the naphthoquinone is first washed out of the waste gas, for which purpose the amount of fresh water to be injected into the atomizer is sufficient if complete equilibrium has been established in the atomizer. The naphthalene is then adsorbed on carbon and the warm, moist waste air is at least partially used for purifying the naphthoquinone.

The carbon is regenerated intermittently either by blowing steam through it or with the preheated fresh air to be used in the oxidation process.

(2) On the other hand, if the separating conditions are chosen so that the resulting naphthoquinone is free from naphthalene so that no warm air saturated with steam is required, naphthalene and naphthoquinone are separated by cooling the waste gases to, for example, 30° C., whereupon a mixture of naphthalene and naphthoquinone is obtained which is advantageously returned to the vaporizer and thence to the reactor (as described in section (e) below).

A waste gas cooled in this manner has given off practically all naphthoquinone and the bulk of naphthalene (corresponding to the vapour tensions of the two substances at 30° C.) as well as part of the by-products referred to above. The final separation and purification of the gases are likewise performed in a column of active carbon which is intermittently regenerated with steam.

(e) Processing naphthoquinone that contains naphthalene.—If a naphthalene-containing naphthoquinone is obtained in the atomizer at a high naphthalene concentration in the converter gases, this product can be transformed into a commercially pure product containing only 0.5 to 1% of naphthalene. For this purpose the mixture of naphthalene and naphthoquinone (from filter 4 in FIGURE 1) is suspended in water or in the mother liquor from the phthalic acid crystallization and conveyed in counter-current to part of the steam-saturated warm, purified waste air (cf. section d, variant 1) through a column or multi-stage apparatus. For this purpose the air is so calibrated that it is saturated with naphthalene on leaving the apparatus. This waste air is combined with the current of waste gas from the atomizer and processed together with it as described in section (d) above.

EXAMPLE 1

A current of converter gas (3 s.c.m. per hour) is brought into contact with water (1.9 liters per hour) in a nozzle.

Before entering the nozzle the converter gases have a temperature of 400° C. and contain per s.c.m. 21.5 g. of naphthoquinone, 16 g. of phthalic anhydride and 12 g. of naphthalene. The feed water has a temperature of 55° C. and contains 5 g. of phthalic acid per liter. A temperature of 57° C. adjusts itself at the discharge opening of the nozzle. The phthalic anhydride undergoes practically momentaneous hydrolysis and forms with the injected water a solution which is strongly oversaturated with respect to phthalic acid, the naphthoquinone precipitates substantially as a readily filterable suspension, and the naphthalene remains almost quantitatively in the gas phase.

To calculate the economy of the process the waste gases were cooled to 20° C. to condense the naphthalene and the naphthoquinone that had not separated. After 200 minutes—that is to say after 10 s.c.m. of converter gases had passed through the nozzle—the experiment was discontinued and the naphthoquinone filtered out of the solution. The crude, moist naphthoquinone was washed on the filter with 300 ml. of water having a temperature of 60° C., to yield moist, commercially pure naphthoquinone, having a water content of about 50%, containing:

190 g. naphthoquinone=98.5% of the dry weight
0.9 g. naphthalene=0.5% of the dry weight
1.4 g. phthalic acid=0.8% of the dry weight 4.5 liters of aqueous solution containing:

|  | Gram |
|---|---|
| Phthalic acid (of which 32 g. stemmed from the water fed into the nozle) | 204 |
| Naphthoquinone | 8 |

0.3 liter of washing liquor containing:

|  | Gram |
|---|---|
| Phthalic acid | 4 |
| Naphthoquinone | 0.5 | condensate on the cooling surfaces of the last condensers, containing:

|  | Gram |
|---|---|
| Naphthalene | 112 |
| Naphthoquinone | 13 |

Thus, 88% of the naphthoquinone contained in the converter gases was obtained in this process step in the form of a commercially pure product suitable for use as it is.

EXAMPLE 2

10 s.c.m. of converter gas containing 270 g. of naphthoquinone, 230 g. of phthalic anhydride and 180 g. of naphthalene are brought in the course of 200 minutes in contact with 8 liters of water in a nozzle.

The inlet temperature of the gases is 440° C., that of the water is 61° C. The exit temperature at the nozzle adjusts itself at 62° C. After washing and filtering there are obtained 237 g. or 88% of the invested naphthoquinone as a moist, commercially pure product, admixed with 0.8% of its dry weight of naphthalene and 1.0% of its dry weight of phthalic acid.

16 g. of naphthoquinone are found in the phthalic acid solution, whereas 15 g. thereof do not condense.

EXAMPLE 3

10 s.c.m. of converter gases containing 130 g. of naphthoquinone, 100 g. of phthalic anhydride and 155 g. of naphthalene are brought in contact with 4.5 liters of water in a nozzle in the course of 200 minutes.

The inlet temperature of the gases is 400° C., that of the water being 60° C. The exit temperature at the nozzle adjusts itself at 60° C. After filtering and washing there are obtained 107 g. or 82% of the invested naphthoquinone as a moist, commercially pure product admixed with 0.9% of its dry weight of naphthalene and 0.6% of its dry weight of phthalic acid. 8 g. of naphthoquinone are found in the phthalic acid solution, whereas 14 g. thereof do not condense.

EXAMPLE 4

10 s.c.m. of converter gas containing 145 g. of naphthoquinone, 180 g. of phthalic anhydride and 70 g. of naphthalene are brought in contact with 7 liters of water in a nozzle within 200 minutes.

The inlet temperature of the gases is 250° C., that of the water being 50° C. The exit temperature of the nozzle adjusts itself at 50° C. After filtering and washing there are obtained 125 g. or 86% of the invested naphthoquinone as a moist, commercially pure product admixed with 0.4% of its dry weight of naphthalene and 1.1% of its dry weight of phthalic acid. 10 g. of naphthoquinone are found in the phthalic acid solution, whereas 9 g. thereof do not condense.

EXAMPLE 5

1 part of naphthoquinone, which contains about 20% of naphthalene and has been recovered from the reactor gas current in the atomizer, is suspended in 10 parts of water and equally distributed over four vessels. A current of air saturated at 50° C. with steam is conveyed at 50° C. from one vessel to the other. At the start this current of air carries away about 5.5 g. of naphthalene per s.c.m., that is to say it almost reaches the value which corresponds to the vapour pressure of naphthalene at 50° C. When about ⅔ of the naphthalene contained in all four vessels has been expelled, the naphthoquinone in the first vessel is examined for its naphthalene content; it is found to be below 1%, and the content of naphthoquinone is about 96%.

EXAMPLE 6

A solution of phthalic acid heated at 55° C., containing 22 g. of phthalic acid per liter and 1.15 g. of naphthoquinone per liter, is purified by being conveyed over a bed of active carbon previously charged with naphthoquinone and then cooled to 27° C. When 30° C. is reached, felt-like crystals precipitate. The whole is slowly cooled with light stirring to 27° C. within 15 minutes and the crystals are then filtered off. There is obtained 0.604 g. of crystallizate per liter, having a naphthoquinone content of 90%.

The remaining filtrate is again heated to 55° C. and conveyed over a bed of fresh active carbon. The issuing solution is free from naphthoquinone and crystallizes immediately on cooling. The phthalic acid is filtered off; the mother liquor is once more heated to 55° C. and conveyed in counter-current over the active carbon charged with naphthoquinone. This furnishes a solution which contains on an average 0.25 g. of naphthoquinone per liter and can be returned to the atomizer.

EXAMPLE 7

A phthalic acid solution heated at 60° C., which contains, per liter, 21 g. of phthalic acid and 1.7 g. of naphthoquinone and a relatively large amount of contaminants is cooled to 25° C. In the course of 24 hours a dark crystallizate forms amounting to 1.48 g. per liter of solution; it has a naphthoquinone content of 67%. The mother liquor, which has a residual naphthoquinone content of 0.7 g. per liter, is further processed as described in Example 5, Section 2.

EXAMPLE 8

1.4 kg. of naphthalene per hour are injected into an air current of 40 s.c.m. per hour so that each s.c.m. of air contains 35 g. of naphthalene, and this charged air is then conveyed over a naphthoquinone catalyst. The reaction gases contain per s.c.m. 17.3 g. of naphthoquinone. Under identical test conditions a mixture of 1.4 kg. of naphthalene and 0.16 kg. of naphthoquinone per hour is then injected into the air current of 40 s.c.m. per hour. (This mixture of naphthalene and naphthoquinone was obtained in the course of the recovery by cooling the products contained in the waste gas current from atomizer.) The reaction gases now contain 20.7 g. of naphthoquinone per s.c.m. Thus, 85% of the injected naphthoquinone are not affected during the transport over the catalyst.

EXAMPLE 9

1.4 kg. of naphthalene per hour are injected into an air current of 40 s.c.m. per hour so that each s.c.m. of air contains 35 g. of naphthalene, and this charged air current is conveyed over a naphthoquinone catalyst. The reaction gases contain 17.3 g. of naphthoquinone per s.c.m. Under identical test conditions a mixture of 1.4 kg. of naphthalene and 0.1 kg. of naphthoquinone per hour is injected into the air current of 40 s.c.m. This mixture of naphthalene and naphthoquinone, which further contains the contaminants extracted at the same time, stems from the extraction of the phthalic acid solution, which has been obtained in the atomizer, with the naphthalene fed into the reactor. The reactor gases now contain 19.45 g. of naphthoquinone per s.c.m. Thus, 86% of the injected naphthoquinone have not been affected during the transport over the catalyst.

What is claimed is:

1. A process for separating naphthoquinone from a hot gas current containing naphthoquinone, phthalic anhydride and naphthalene, wherein water is atomized in an atomizer in a manner such that the gas current assumes a temperature of 30° to 70° C., naphthoquinone and phthalic acid anhydride being retained by the aqueous medium having a temperature of 30° to 70° C., whereas the bulk of the naphthalene remains in the gas current, and the naphthoquinone is then isolated from the aqueous medium.

2. A process as claimed in claim 1, wherein the isolated naphthoquinone is freed from the admixed naphthalene by suspending the resulting naphthalene-containing naphthoquinone in water, blowing out the naphthalene with steam-saturated air and then filtering the naphthoquinone off.

3. A process as claimed in claim 1, wherein the resulting phthalic acid solution is freed from the naphthoquinone dissolved in it and from contaminants by conveying the warm solution over active carbon saturated with naphthoquinone and then cooling the solution.

4. A process as claimed in claim 1, wherein the resulting phthalic acid solution is freed from the naphthoquinone dissolved in it and from contaminants by cooling the solution directly, whereupon part of the naphthoquinone crystallizes out and is isolated, the resulting solution is then once more heated, conveyed over fresh active carbon and then once more cooled, whereupon phthalic acid crystallizes out and is separated.

5. A process as claimed in claim 1, wherein the naphthalene contained in the gas current is separated by first washing the gas current with water at the temperature prevailing in the atomizer, whereupon the naphthalene is isolated by adsorption on active carbon.

6. A process as claimed in claim 1, wherein the current of waste gas is directly cooled and the naphthalene together with the naphthoquinone are isolated and finally purified by conducting the gas current through a column of active carbon.

7. A process as claimed in claim 1, wherein the naphthalene intended for feeding the reactor is used for extracting the naphthoquinone and the contaminants from the phthalic acid solution.

8. A process as claimed in claim 1, wherein the mixture of naphthalene and naphthoquinone resulting from the extraction of the phthalic acid solution with naphthalene, as well as the mixture of naphthalene and naphthoquinone obtained by recovery of the products from the current of waste gas, are once more vaporized in the current of oxidizing air, whereupon the non-volatile by-products are separated in the vaporizer whereas the volatile by-products are specifically burnt up on the catalyst and the bulk of naphthoquinone passes through the reactor without undergoing decomposition.

References Cited

UNITED STATES PATENTS 2,938,913   5/1960   Weyker et al. _____ 260—396

LORRAINE A. WEINBERGER, *Primary Examiner.*

L. THAXTON, *Assistant Examiner.*